United States Patent Office 3,248,372
Patented Apr. 26, 1966

3,248,372
GLYCOL MODIFIED ISOCYANURATE CONTAINING POLYISOCYANATES
Wilhelm Bunge, Leverkusen, Germany, assignor to Farbenfabriken Bayer Aktiengesellschaft, Leverkusen, Germany, a German corporation
No Drawing. Filed Nov. 3, 1961, Ser. No. 149,856
Claims priority, application Germany, Nov. 8, 1960,
F 32,496
7 Claims. (Cl. 260—77.5)

This invention relates generally to organic polyisocyanates and more particularly to a novel organic polyisocyanate and to a method for making it.

Lacquers and coatings having many advantageous characteristics can be prepared from a solvent solution of the reaction product of an organic polyisocyanate and an organic compound having hydrogen atoms reactive with an —NCO group and determinable by the Zerewitinoff method. However, monomeric organic polyisocyanates have a relatively high vapor pressure at ordinary room temperature and because of the toxicity of the vapors, they must be handled with extreme care during the formulation of the lacquer or other coating materials.

It has been proposed to polymerize a monomeric organic polyisocyanate and to use the resulting polymer having a low vapor pressure for making lacquers or the like. For example, it has been proposed to prepare the trimer of toluylene diisocyanate. Such a product has a relatively low vapor pressure and would be advantageously for making lacquers and the like except for the fact that all of the monomer is not trimerized by conventional procedures. An appreciable amount, as much as 10% monomeric organic polyisocyanate or more, remains in admixture with the trimer if the polymerization is stopped at the point where the polymer is still soluble in solvents conventionally used for making lacquers.

It has been proposed to purify the polymer while it contains the polymerization catalyst by means of a vacuum treatment or by extracting any monomer remaining with a solvent therefor, which is a nonsolvent for the polymer. Such purification methods have many disadvantages. They complicate the procedure for making the polymer and making a lacquer therefrom. Moreover, the removal of monomer by vacuum treatment is inefficient and must be conducted at high temperatures which are above the softening point of the polymer. Side reactions usually occur during the heat treatment with —NCO groups being consumed and with the formation of products of high molecular weight, which are often insoluble in the solvents used to make lacquers.

The monomer present in the polymer can be removed by extraction only by employing several extraction steps. Such a process requires the use of a large amount of solvent which must be substantially anhydrous in order to avoid reaction with —NCO groups to form ureas and biurets.

It is therefore an object of this invention to provide a method for making a trimer or higher polymer of an organic diisocyanate substantially free from reacted monomer which is devoid of the foregoing disadvantages. Another object of the invention is to provide a polymeric organic polyisocyanate which is soluble in organic solvents conventionally used in making lacquers and containing less than 1% of monomeric organic polyisocyanate. Still another object of the invention is to provide a simple method for making a trimer of an organic polyisocyanate which can be used to advantage in making lacquers or the like.

The foregoing objects and others are accomplished in accordance with this invention, generally speaking, by providing a method for polymerizing an organic polyisocyanate to form a polymer having unreacted —NCO groups wherein a monomeric organic diisocyanate is reacted with a glycol and the resulting urethane diisocyanate is heated under alkaline conditions until a polymeric organic polyisocyanate soluble in organic solvents conventionally used in making lacquers and containing less than about 1% of the monomer in admixture therewith is obtained. It has been found that such a product, predominantly a trimer, having unreacted —NCO groups and containing less than 1% monomer can be prepared from any organic diisocyanate including those which have two —NCO groups which have substantially the same chemical reactivity with reactive hydrogen atoms determinable by the Zerewitinoff method.

In one embodiment of the invention, two mols of an organic diisocyanate are reacted with one mol of a glycol at a temperature slightly above room temperature and this product is then heated in alkaline solution until a trimer soluble in lacquer solvents is obtained. It is possible to use a relatively large excess of organic diisocyanate over that stoichiometrically required to react with all of the hydroxyl groups of the glycol and to separate the excess organic diisocyanate from the resulting urethane diisocyanate by subjecting the mixture to a vacuum treatment or a single extraction with a solvent. A small amount of monomer will be left with the urethane diisocyanate after the vacuum treatment, but the amount thereof will be reduced below 1% in the subsequent polymerization step. If desired, the reaction between the organic diisocyanate and the glycol can be carried out in an inert organic solvent of the two reactants. The resulting urethane diisocyanate can be separated from the solvent by crystallization if a solvent which is a nonsolvent for the diisocyanate is selected.

As indicated above, it is not necessary for all of the monomeric organic polyisocyanate to be removed from the urethane diisocyanate when an excess of organic polyisocyanate is used because the amount of monomer will be reduced during the polymerization step to less than 1% unreacted monomer through polymerization of the monomer with the urethane diisocyanate.

Any suitable organic diisocyanate can be polymerized in accordance with the invention including aromatic, aliphatic and heterocyclic. In other words, two —NCO groups may be bonded to any suitable divalent organic radical to produce the organic diisocyanates which are useful in accordance with the present invention including acyclic, alicyclic, aromatic and heterocyclic radicals. Suitable organic diisocyanates are, for example, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy - 4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate and furfurylidene diisocyanate or the like. Organic diisocyanates which are preferred for making trimers useful in making lacquers are 2,4 and 2,6-toluylene diisocyanate and mixtures thereof. An 80% 2,4-toluylene diisocyanate and 20% 2,6-toluylene diisocyanate has been found to be particularly advantageous.

Any suitable glycol can be used to prepare the urethane diisocyanate. Examples of such glycols include ethylene glycol, diethylene glycol, triethylene glycol, propylene glycol, polypropylene glycols of low molecular weight such as di and tripropylene glycols, butanediol, butinediol, 2,2-dimethylpropane-1,3-diol, hexane-1,6-diol, 2-ethylhexane-1,3-diol, octadecanediol, octadecenediol, thiodiglycol; monoethers of trihydric alcohols, for example, trimethylol propane-monoallyl ether; quinitol, bis-hydroxyethyl ether of hydroquinone and of 4,4′-dihydroxydiphenyl dimethyl methane and terephthalic acid bis-ethylene glycol ester. Mixtures of these glycols also can be employed advantageously.

The urethane diisocyanates can be converted into the trimer by heating them in the form of a melt or by heating them while dissolved in a suitable inert organic solvent therefor. It is preferred to effect the polymerization while the urethane diisocyanate is dissolved in a suitable solvent containing a catalytic amount of basic catalyst. Any suitable inert organic solvent for the urethane diisocyanate can be used such as, for example, chlorinated hydrocarbons including chlorobenzene, dichlorobenzene, chloronaphthalene or the like; ketones such as, for example, acetone, methyl ethyl ketone or the like; esters such as ethyl acetate, methyl glycol acetate or the like; benzine, mineral spirits and the like. The concentration of the diisocyanate in the solvent can vary widely and is usually chosen so that the solution of the trimer will be of about the right concentration for use in making a lacquer.

Any basic compound known to catalyze polymerization of —NCO groups can be used such as, for example, tertiary amines, including dimethyl aniline, hexahydrodimethyl aniline, N-ethyl morpholine, N-methyl morpholine, permethylated diethylene triamine, triethylene tetramine, dimethyl piperazine, diethyl piperazine, triethylene diamine, urethanes of one mol N,N-dimethyl amino ethanol and one mol phenyl isocyanate, or one mol cyclohexyl isocyanate, a urethane of one mol N,N-diethyl amino ethanol or the like; and one mol phenyl isocyanate or one mol cyclohexyl isocyanate, a diurethane of one mol of N-methyl diethanol amine or the like, and two mols of phenyl isocyanate or two mols cyclohexyl isocyanate, N,N-dialkylethanol amines such as, N,N-dimethyl ethanol amine, N,N-diethyl ethanol amine and the like; the N-alkyl diethanol amines, such as N-methyl or N-ethyl diethanol amine, trialkyl amines, such as triethyl amine, trimethyl amine and the like. Other suitable catalysts include the alkyl metal hydroxides and salts, such as, for example, potassium hydroxide, sodium hydroxide, lithium hydroxide, sodium phenolate, potassium phenolate, potassium methylate, sodium methylate, potassium ethylate, sodium ethylate and the like.

Any catalytic amount of the catalyst can be used, but ordinarily from 0.01 to about 1% by weight based on the weight of urethane diisocyanate is preferred. Sometimes when using less active tertiary amines up to 2% by weight of catalyst are advisable. The course of polymerization of the diisocyanate can be followed by determining the —NCO content of the polymer at various stages in the polymerization. The polymerization can be stopped at any time by neutralizing the catalyst with an acid compound such as, for example, a halohydric acid, a chloride, an anorganic acid, a carboxylic acid a carboxylic acid chloride or sulpho acid in an amount substantially equal to the basic catalyst. Examples of such neutralizing agents include benzoyl chloride, acetyl chloride, hydrochloric acid, phosphoric acid, acetic acid, toluylene sulfonic acid, toluylene sulfonic acid methyl ester and the like. It is preferred to polymerize the urethane diisocyanate by heating it at a temperature of about 50° C. to about 200° C. until the —NCO content of the product is about 50% of the —NCO content of the urethane diisocyanate. It is preferred that the polymer contain from about 5% to about 15% unreacted —NCO and less than 1% unreacted monomeric organic diisocyanate. However, one of the advantages of the process provided by this invention is that polymerization can be stopped at any point desired without the product being undesirably toxic because any urethane diisocyanate present has a relatively high vapor pressure and can be tolerated in the process.

As indicated hereinbefore, the polymer prepared in accordance with this invention contains not more than 1% of the monomeric organic diisocyanate and in many cases none at all can be detected in the product.

The polymer provided by this invention can be used for making lacquers, adhesives and the like; or it can be used for making polyurethane foam which in turn can be used for upholstery purposes. The polymer can also be used for making magnetic sound carriers and as adhesives in the rubber processing industry. If desired, the polymer of this invention can be reacted with a phenol or ester to form a blocked polyisocyanate which upon heating reverts to the compound containing unreacted —NCO groups. For example, all the —NCO groups of the polymer can be reacted with phenol to form a urethane which splits into the polymer and free phenol when heated. Acetoacetic ester or malonic ester can be substituted for the phenol or cresol, if desired.

The invention is further illustrated, but not limited by the following examples, in which parts and percentages are by weight unless otherwise specified.

*Example 1*

About 297 parts by weight of toluylene diisocyanate are dissolved in about 300 parts by weight of ethyl acetate, heated to about 70° C. and then a solution of about 53 parts by weight of ethylene glycol and about 50 parts by weight of ethyl acetate is added gradually while stirring. The heat of reaction is removed by a slight external cooling. The 50% solution of the reaction product now contains about 10% of —NCO and about 2.8% of unreacted toluylene diisocyanate.

About 1.8 parts by weight of a 10% solution of the permethylated diethylene triamine in o-dichlorobenzene are added to the solution at about 70° C. and the mixture is left at this temperature. After about ten hours, the —NCO content of the solution has fallen to 6.6% and the content of unreacted toluylene diisocyanate to 0.3%. The action of the basic catalyst is stopped by adding about 0.2 part by weight of benzoyl chloride, so that further heating does not cause any fall in the —NCO number. A slightly yellowish, oily solution is obtained, which shows the characteristic bands of the isocyanurate ring system above the isocyanate band in the infrared spectrum.

*Example 2*

About 2,784 parts by weight of toluylene diisocyanate are mixed in about two hours at about 70° C. to about 80° C. with about 360 parts by weight of butylene-1,3-glycol while stirring well and thereafter left for about another four hours at this temperature. While raising the temperature to about 130° C., a vacuum of 0.5 mm. Hg is applied. About 1,226 parts by weight of the excess diisocyanate distills off and about 1,918 parts by weight of a residue which is resinous in the cold state remains in the reaction vessel. The said residue contains about 20% of —NCO with about 6.5% of toluylene diisocyanate which has not reacted.

About 300 parts by weight of the resinous residue are transformed into a 60% solution by adding about 200 parts by weight of methyl glycol ether acetate, heated to about 120° C. and then about 0.5 part by weight of the reaction product of two mols of phenyl isocyanate and one mol of N-methyl diethanol amine is added. Over a period of about nine hours, the —NCO content of the solution falls from 12% to 7.7%, while the content of unreacted diisocyanate falls from 3.9% to 0.4%. The polymerization is stopped by adding 0.5 parts by weight of acetyl chloride and a stable, viscous polyisocyanate solution is obtained.

*Example 3*

About 450 parts by weight of butylene-1,3-glycol are gradually added at about 70° C. to about 3,480 parts by weight of toluylene diisocyanate and kept at about 70° C. After a few hours, a crystalline precipitation commences and this becomes increasingly stronger. About 1,000 parts by weight of light benzine are added and about 1,566 parts by weight of the solid substance are separated from the benzine solution, which can be used for further mixtures.

About 1,240 parts by weight of the crystalline substance, still containing unreacted diisocyanate, are dissolved in the mixture of about 620 parts by weight of ethyl acetate and about 620 parts by weight of methyl glycol ether acetate and then about 12 parts by weight of a 10% solution of the permethylated triethylene tetramine in chlorobenzene are added at about 70° C. to about 80° C.

The —NCO content of the solution falls after about six hours from 9.5% to 8%, after about seven hours to 7.2% and after about twelve hours to 6.5%. About 1.2 parts by weight of benzoyl chloride are added and a storable polyisocyanate solution, which no longer contains any unreacted diisocyanate, is obtained.

*Example 4*

About 90 parts by weight of butylene-1,3-glycol are added to about 672 parts by weight of hexamethylene diisocyanate during about thirty minutes at about 80° C. to about 90° C while stirring well and the mixture is heated for about another six hours at about 90° C. Some of the excess diisocyanate is then distilled off in vacuo at about 110° C. to about 115° C. and the initial concentrate is continuously conducted over a film evaporator at about 200° C. and 0.1 mm. Hg.

About 0.4 part by weight of the permethylated diethylene triamine is added to about 100 parts by weight of the urethane isocyanate thus obtained (—NCO content 18.2%), which is then treated for about ten hours at about 120° C. and for about five hours at about 140° C.; about 0.3 part by weight of acetyl chloride is thereafter added.

This product is viscous at room temperature and now contains 12.0% of —NCO. Even after being brushed on to thin surfaces, it is no longer possible to detect any unreacted diisocyanate.

Although the invention has been described in considerable detail for the purpose of illustration, it is to be understood that variations can be made by those skilled in the art without departing from the spirit of the invention or the scope of the claims.

What is claimed is:

1. A method for making compounds containing isocyanurate rings and unreacted —NCO groups substantially free from monomeric organic diisocyanate which comprises mixing a monomeric organic diisocyanate with a glycol and reacting the diisocyanate with the glycol to form a urethane having two unreacted —NCO groups, and heating the mixture under alkaline conditions until about one half of the unreacted —NCO groups of the urethane have polymerized and the unreacted monomeric organic diisocyanate in the mixture has been reduced to a concentration of less than about 1 percent.

2. The process of claim 1 wherein the monomeric organic polyisocyanate is toluylene diisocyanate.

3. The product of the process of claim 1.

4. The process of claim 1 wherein the polymerization is conducted with a catalytic amount of a tertiary amine.

5. The process of claim 1 wherein the urethane is a diurethane of ethylene glycol and toluylene diisocyanate.

6. The product of the process of claim 5.

7. The process of claim 1 wherein the urethane is polymerized while dissolved in an inert organic solvent therefor.

References Cited by the Examiner
UNITED STATES PATENTS

| | | | |
|---|---|---|---|
| 2,978,449 | 4/1961 | France | 260—77.5 |
| 2,979,485 | 4/1961 | Burkus | 260—77.5 |
| 2,993,870 | 7/1961 | Burkus | 260—77.5 |
| 3,001,973 | 9/1961 | Piepenbrink | 260—77.5 |
| 3,048,566 | 8/1962 | Beaman | 260—77.5 |
| 3,143,517 | 8/1964 | Heiss | 260—77.5 |

LEON J. BERCOVITZ, *Primary Examiner.*

LOUISE P. QUAST, *Examiner.*

M. C. JACOBS, *Assistant Examiner.*